United States Patent [19]

Premiski et al.

[11] Patent Number: 4,776,238
[45] Date of Patent: Oct. 11, 1988

[54] AUTOMATIC TRANSMISSION BRAKE ASSEMBLY INCLUDING AN OVERRUNNING ROLLER BRAKE AND A FRICTION BRAKE

[75] Inventors: Vladimir Premiski, BAM Willerscheid; Rainer Höhnel, Pulheim; Claudia Premiski, BAM Willerscheid, all of Fed. Rep. of Germany

[73] Assignee: Ford Motor Company, Dearborn, Mich.

[21] Appl. No.: 30,769

[22] Filed: Mar. 25, 1987

[30] Foreign Application Priority Data

Apr. 10, 1986 [DE] Fed. Rep. of Germany ....... 3612046

[51] Int. Cl.[4] .................. F16H 57/10; F16C 17/02
[52] U.S. Cl. .................. 74/789; 188/82.84; 192/45; 384/127; 384/572; 384/578
[58] Field of Search .......... 74/753, 789; 192/45; 384/127, 572, 578; 188/82.8, 82.84

[56] References Cited

U.S. PATENT DOCUMENTS

| | | | |
|---|---|---|---|
| 3,104,744 | 9/1963 | Wade | 192/45 |
| 3,166,169 | 1/1965 | Wade et al. | 192/45 |
| 3,256,751 | 6/1966 | Tuck et al. | 192/45 |
| 3,613,481 | 10/1971 | Lapinski | 74/743 |
| 3,830,117 | 8/1974 | Kodamya et al. | 74/753 |
| 3,942,616 | 3/1976 | Elmore | 192/45 |
| 4,347,763 | 9/1982 | Sakakibara et al. | 188/82.8 |
| 4,398,434 | 8/1983 | Kimura | 192/45 |

FOREIGN PATENT DOCUMENTS

| | | | |
|---|---|---|---|
| 69981 | 1/1983 | European Pat. Off. | 74/753 |
| 3417703 | 11/1985 | Fed. Rep. of Germany . | |
| 1419236 | 12/1975 | United Kingdom | 192/45 |

Primary Examiner—Leslie A. Braun
Assistant Examiner—Scott Anchell
Attorney, Agent, or Firm—Donald J. Harrington; Keith L. Zerschling

[57] ABSTRACT

An overrunning roller brake, in particular for automatic transmissions for motor vehicles having a brake race fixed to the gearbox casing, a rotating brake race connected to one element of a planetary gear unit and overrunning brake rollers arranged between the two bearing raced wherein support rings with a C-shaped cross-section are disposed between the races, the rotating brake race being in the form of a one-piece extrusion which forms both the rotating outer brake race of the overrunning roller brake and a friction brake drum for the gear unit, and retainer rings within the support rings for accommodating radial loads and for stabilizing the outer race.

6 Claims, 3 Drawing Sheets

AUTOMATIC TRANSMISSION BRAKE ASSEMBLY INCLUDING AN OVERRUNNING ROLLER BRAKE AND A FRICTION BRAKE

BACKGROUND OF THE INVENTION

The invention relates to automatic transmissions for motor vehicles, particularly compound brakes having series related roller brake and friction brake portions.

A freewheeling roller brake used to anchor a reaction element of gearing for an automatic transmission is shown in U.S. Pat. No. 3,613,481, which is assigned to the assignee of this invention. The gearing of that prior art reference has inner and outer bearing races that cooperate with one another and that are mounted concentrically with respect to each other by means of support rings of C-shaped cross-section. The support rings are disposed laterally on either side of the brake rollers.

The outer bearing race of the prior art design of the '481 patent is arranged rotationally rigidly on the gearbox casing, and the inner bearing race is connected drivably to the second planet gear carrier of a Simpson-type planet gear system. The connection comprises a drum-shaped component that is engaged by a brake and that is connected to the inner bearing race by means of a radial hub. The inner bearing ring is supported and mounted on part of the drive shaft of the transmission. A disadvantage of the prior art arrangement is that the radial hub and drum-shaped component is relatively complex in its construction.

Another overrunning brake roller is disclosed in German Offenlegungsschrift (Laid-Open Specification) 34 17 703. The inner bearing race of that prior art reference (FIG. 1B) is fixed to the transmission casing, while the outer bearing race is connected drivably to the second of the two planet gear carriers of a Simpson-type planet gear system. The connection is likewise effected by means of a drum-shaped component which is engaged by a braking device and which is supported on an extended portion of the inner bearing race by means of a radial hub. Like the prior art design described above, this drum-shaped component is relatively complex in design.

GENERAL DESCRIPTION OF THE INVENTION

The object of the invention is to provide an overrunning roller brake that can be connected to the second of the pair of planet gear carriers of a Simpson-type planet gear system and that can be mounted and supported in the transmission housing with minimum complexity in construction and assembly.

The drum-shaped component connected to the reaction element of the planet gear system is constructed in the form of a one-piece, extrusion-moulded component that serves also as the rotating outer bearing race of an overrunning roller brake. Support rings, formed as C-shaped components that are deep-drawn from bronze-plated steel sheet, are disposed between the races in axially spaced relationship. The open sides of the support rings are closed by retaining rings that are securely joined to the support rings by wedge-shaped indentations at points located on the peripheries of the support rings and the retainer rings. This improved mounting arrangement for the drum-shaped component connected to the planet gear carrier of a Simpson-type planet gear system makes it possible to eliminate the need for a complex radial hub for the drum-shaped component. The heavy-duty support provided by the support rings on either side of the overrunning brake rollers establishes complete stability for the drum-shaped component and accommodates radial loads developed by the surrounding brake band.

The support rings of a second embodiment of the invention comprise arms that extend axially beyond the plane of the adjacent retaining rings. These engage axial projections on the overrunning brake rollers to form a preassembled unit that permits a simple and time-saving automatic assembly by means of robots.

By virtue of the fact that the retaining ring for the C-shaped suport rings are formed of bronze-plated steel or are formed entirely of steel, depending on the design of the cage for the overrunning brake rollers, simplicity in design and cost reduction of the assembly are even more apparent.

BRIEF DESCRIPTION OF THE DRAWINGS

The invention is described in greater detail with reference to the embodiment illustrated in the accompanying drawings in which.

PARTICULAR DESCRIPTION OF THE INVENTION

Figure 1:
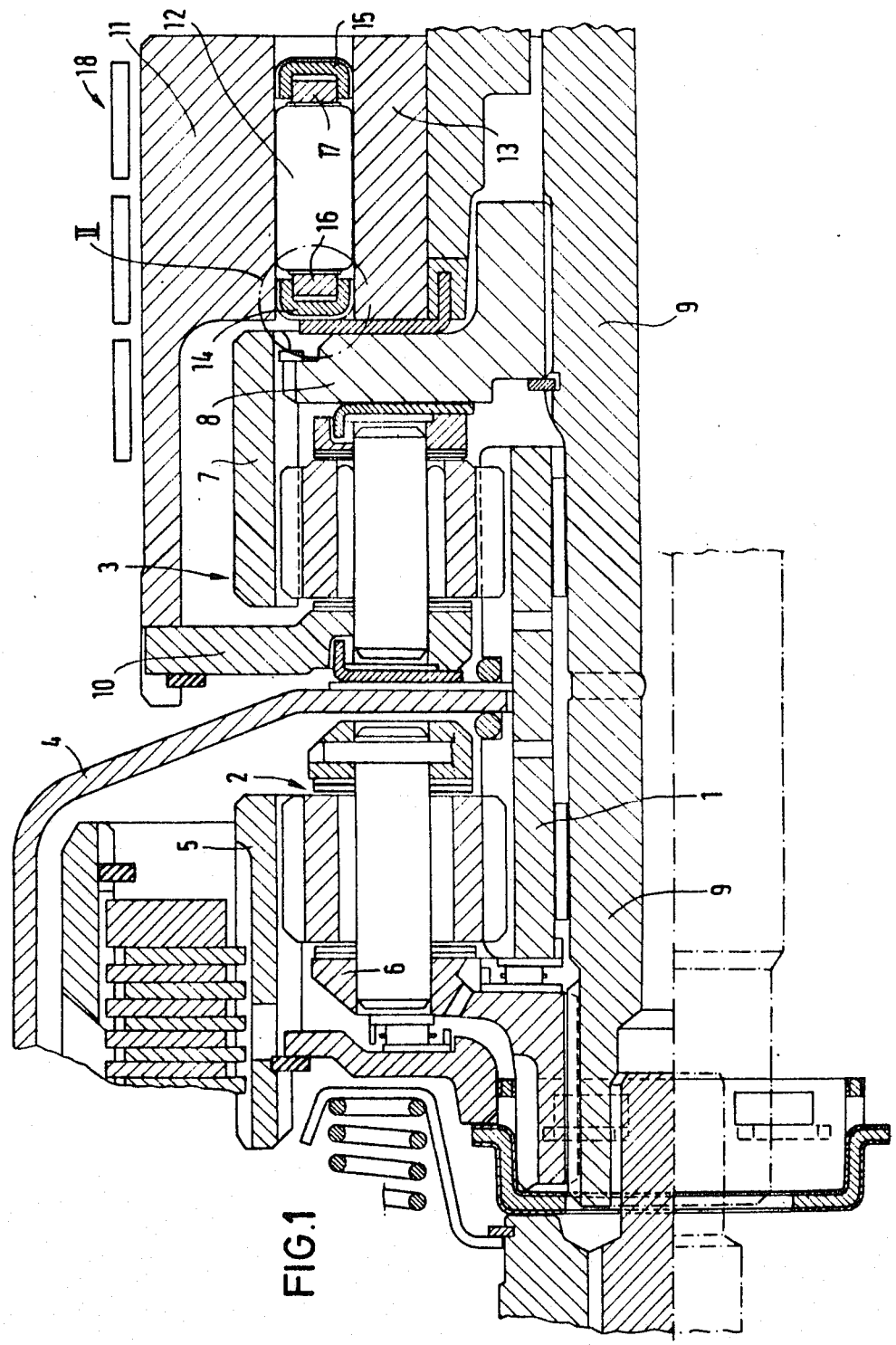
FIG. 1 is a partial cross-sectional view through the area of a Simpson-type planet gear system of an automatic transmission with an overrunning roller brake assembly embodying the invention.

The Simpson-type planet gear system frequently used in an automatic transmission for motor vehicles is shown in FIG. 1. It comprises two planet gear units 2 and 3, which are connected together by means of a common sun gear 1. It is possible to distribute driving torque through either the driving member 4 and a forward gear clutch (not shown) or through the ring gear 5 of the first planetary gear unit and a direct-drive clutch (partially shown). The planet gear carrier 6 of the first planetary gear unit 2 is connected drivably to the driven shaft 9 of the transmission. Likewise, ring gear 7 of the second planetary gear unit 3 is connected either directly or by means of a hub part 8 to the driven shaft 9.

The Simpson-type gear system provides three forward drive speed ratios and a single reverse drive ratio. It also provides a "manual low" drive range wherein the carrier for the gear unit acts as a torque reaction element with no upshifting to higher speed ratios.

The planet gear carrier 10 of the second planetary gear unit 3 is connected drivably to the drum-shaped component 11, which is constructed in the form of a one-piece extrusion. Component 11 forms the rotating outer race of an overrunning roller brake 12, the inner brake race 13 of which is fixed to the transmission casing (indicated partially only).

The drum-shaped component 11 serves as a brake drum for band brake 18 by means of which the planet gear carrier 10 can be braked to form a reaction element.

According to the invention a secure concentric support and mounting for the drum-shaped component 11 with respect to the inner brake race 13 is provided by support rings 14 and 15, which are disposed laterally of the overrunning brake rollers 12. The support rings have a C-shaped cross-section and they surround retaining rings 16 and 17.

A multiple-wrap brake band 18 is adapted to brake the planet gear carrier 10 of the second planetary gear set 3 to prevent rotation of carrier 10 during reverse drive, during coasting and during operation of the transmission in the "manual low" drive range. This causes considerable bearing forces on the support rings 14 and 15.

In prior art designs this bearing force is absorbed by support rings. The support rings consist of solid brass material, which is relatively expensive. The arrangement of C-shaped support rings, which would be cheaper to produce, was not possible in arrangements of the kind described here since the laterally open support rings could not absorb such a high load. Only with the retaining rings provided according to the invention has it been possible to use C-shaped support rings that are considerably cheaper to produce for use in this bearing application.

Figure 2:
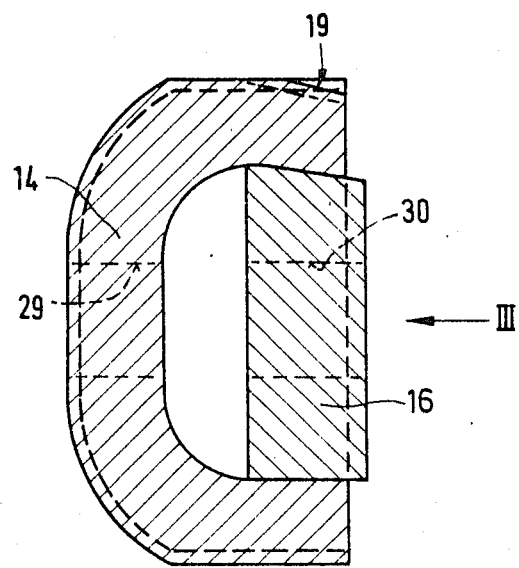
FIG. 2 is an enlarged view of the arrangement of the C-shaped support rings illustrated in circle II in FIG. 1.
Figure 3:
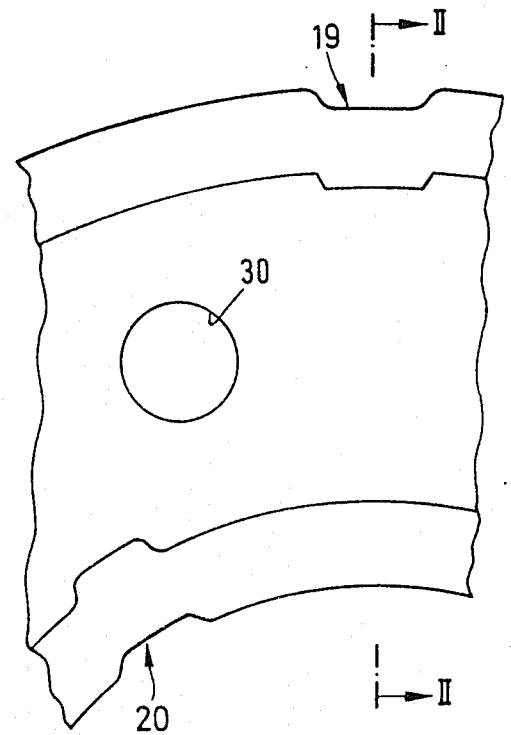
FIG. 3 is a partial view of FIG. 2 in the direction of arrow III of FIG. 2.

As shown in FIGS. 2 and 3, the C-shaped support ring 14 consists of bronze-plated steel sheet stock that can be formed as a deep-drawn component with the required degree of precision. A correspondingly adapted retaining ring 16, likewise of bronze-plated steel sheet, is inserted in the open area of C-shaped support ring 14 and is securely connected to support ring 14 by radial indentations 19 and 20, respectively, at spaced points on both the outer periphery and the inner periphery.

Depending upon whether the of the rollers for overrunning brake 12 consists of steel sheet or plastic material, the retaining rings 16 and 17 respectively can consist of either bronze-plated steel or entirely of steel. The friction characteristic and the bearing strength of plastic upon steel are sufficient to accommodate stresses that occur.

Figure 4:
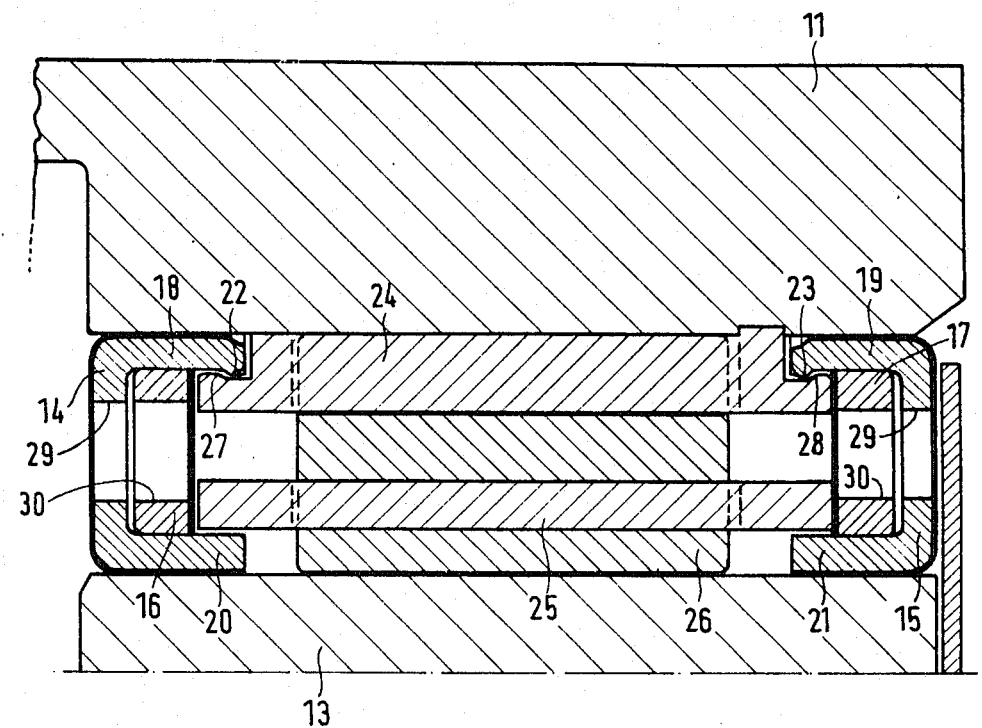
FIG. 4 is a partial cross-sectional view of an alternate embodiment of a preassembled unit formed by overrunning brake rollers and the support rings.

The overrunning brake rollers illustrated in FIG. 4 comprise a sub-assembly which can be inserted between the inner brake race 13 and the outer brake race 11. It is formed by rollers 26 guided in an outer cage 24 and an inner cage 25. Support rings 14 and 15 of C-shaped cross-section are arranged laterally and surround retaining rings 16 and 17.

The outer cage 24 comprises laterally offset areas 27 and 28, which cooperate in a locking relationship with bent areas 22 and 23 on the outer arms 18 and 19 of the support rings 14 and 15 extending beyond the plane of the retaining rings 16 and 17.

The inner cage 25 is guided in the axial direction by means of the inner arms 20 and 21 of the support rings 18 and 19. These likewise extend axially beyond the plane of the retaining rings 16 and 17.

In a manner similar to that of the outer cage 24, a locking means can also be provided between the inner cage 25 and the lateral support rings 14 and 15.

Bores 29 and 30 ensure an adequate supply of lubricating oil into the interior of the overrunning roller brake assembly. Oil thus is distributed to the vertical bearing surfaces in all the embodiments of the support rings 14 and 15 and the retaining rings 16 and 17.

Having thus described a preferred embodiment of our invention, what we claim and desire to secure by U.S. Letters Patent is:

1. In an overrunning roller brake assembly for a planetary gear unit in an automatic transmission for automobiles, said gear unit having a ring gear, a carrier and a sun gear, said carrier having planet pinions thereon engaging said sun and ring gears;
   a brake for anchoring a reaction member of said gear unit, at least one other member of said gear unit being adapted to receive driving torque;
   said brake comprising an annular inner brake race surrounding a fixed part of said transmission, an annular outer brake race connected to said reaction member and surrounding said inner race, said outer race comprising an extrusion with an outer brake drum surface adapted to be engaged by a reaction friction brake band;
   overrunning brake rollers between said races, a pair of support rings between said races on either side of said rollers;
   said support rings having a C-shaped cross section whereby the inner and outer surfaces thereof provide a bearing support for said races;
   retainer rings enclosed within said support rings, said retainer rings having a radial thickness approximately equal to the radial inside dimension of said C-shaped cross section of said support rings whereby radial loads are transmitted between said races through said retainer rings and support rings.

2. The combination as set forth in claim 1 including interlocking projections and recesses on said retainer and support rings respectively thereby forming a unitary cage structure to facilitate assembly.

3. The combination as set forth in claim 2 wherein said extrusion is connected to the carrier of said gear unit, said transmission having a driven shaft concentrically disposed with respect to said gear unit, the ring gear of said gear unit being connected drivably to said driven shaft, and the carrier of said gear unit being connected drivably to said extrusion.

4. The combination as set forth in claim 1 wherein said brake comprises an outer cage ring between said rollers and said extrusion and an inner cage ring between said rollers and said fixed part of said transmission, and interlocking parts on said support rings and one of said cage rings whereby a unitary overrunning brake case for said rollers is provided.

5. The combination as set forth in claim 4 wherein said extrusion is connected to the carrier of said gear unit, said transmission having a driven shaft concentrically disposed with respect to said gear unit, the ring gear of said gear unit being connected drivably to said driven shaft, and the carrier of said gear unit being connected drivably to said extrusion.

6. The combination as set forth in claim 1 wherein said extrusion is connected to the carrier of said gear unit, said transmission having a driven shaft concentrically disposed with respect to said gear unit, the ring gear of said gear unit being connected drivably to said driven shaft, and the carrier of said gear unit being connected drivably to said extrusion.

* * * * *